United States Patent [19]

Mottez et al.

[11] 3,755,191

[45] Aug. 28, 1973

[54] METHOD FOR DIRECT PREPARATION OF ANTI-STAIN PLASTICIZER COMPOSITION

[75] Inventors: Paul Mottez, Loison-sous-Lens; Regis Lejeune, Lens, both of France

[73] Assignee: Societe Chimique Des Charbonnages C.d.F. Chimie, Tour Aurore-Paris, France

[22] Filed: Nov. 17, 1971

[21] Appl. No.: 199,724

[30] Foreign Application Priority Data
Nov. 19, 1970 France .............................. 7041512

[52] U.S. Cl............. 252/364, 106/311, 260/31.8 W
[51] Int. Cl........ B01f 1/00, C08f 45/40, C08k 1/36
[58] Field of Search................. 252/364, 363.5, 170; 106/311; 260/31.8 W

[56] References Cited
UNITED STATES PATENTS
2,502,371  3/1950  Darby ........................... 260/31.8 W
2,622,038  12/1952  Charlesworth et al.......... 252/364 X
2,671,769  3/1954  Cowell.......................... 260/31.8 W Primary Examiner—Richard D. Lovering
Attorney—Lorimer P. Brooks, G. Thomas Delahunty et al.

[57] ABSTRACT

Anti-stain plasticizer for polymers, its method of preparation and its use in vinyl polymers. This plasticizer is constituted by a mixture of butyl benzyl phthalate and dibenzyl phthalate, the amount of dibenzyl phthalate in the mixture being comprised between 20 and 60 percent by weight. It is obtained in a single esterification reaction by preparing a mixture of butyl acid phthalate and phthalic anhydride, which is subsequently reacted with benzyl chloride. This plasticizer is used for obtaining polyvinyl chloride or other flexible vinyl polymers having clearly improved anti-stain properties.

4 Claims, No Drawings

METHOD FOR DIRECT PREPARATION OF ANTI-STAIN PLASTICIZER COMPOSITION

This invention relates to a new anti-stain plasticizer for polymers.

It is known that alcohols having an aromatic nucleus give "anti-stain" plasticizers. Thus, benzyl alcohol makes it possible to produce butyl-benzyl phthalate and the aromatic nucleus which it carries in the plasticizer molecule distinctly improves the anti-stain properties. Dibutyl and dioctyl phthalates, for example, have properties, which are not as good from this point of view.

If benzyl alcohol is used alone, dibenzyl phthalate is obtained. It is a pasty product which is an excellent anti-stain plasticizer, but which has the drawback of being difficult to use and even if being incompatible with certain adjuvants of PVC (polyvinyl chloride) in particular with different colourants.

Now, it has been discovered that a mixture of butyl-benzyl phthalate and dibenzyl phthalate had all the advantages of dibenzyl phthalate used alone, but without having its disadvantages. The content of dibenzyl phthalate in the mixture should be from 20–60 percent, by weight preferably from 35–40 percent by weight.

Therefore, in their capacity as new products, the invention relates to mixtures of butyl-benzyl phthalate and of dibenzyl phthalate in which the amount of dibenzyl phthalate present is between 20 and 60 percent by weight.

This mixture of phthalates may be obtained by direct manufacture without preparing individual phthalates. The latter is a more economic means for obtaining this mixture.

Another object of the invention is, therefore, the direct manufacture of the mixture of butyl-benzyl phthalate and dibenzyl phthalate, in the above-mentioned proportions.

The method of direct manufacture of mixtures according to the invention, is characterized in that an amount of butyl alcohol, corresponding to the amount of butyl radicals which it is desired to introduce into the final mixture, is reacted with phthalic anhydride at a temperature of between 105° and 120°C, then in that this mixture is poured, at a temperature in the region of 100°C, into a mixture containing benzyl chloride, anhydrous sodium carbonate and triethylamine, the amount of benzyl chloride being sufficient to esterify the free, anhydrous functions of phthalic anhydride, in that during the reaction one mole of water per mole of phthalic anhydride initially used is added to the mixture, and that the reaction takes place at a temperature of between 100° and 115°C, then in that the mixture obtained is dehydrated by heating, before isolating and purifying the mixture of phthalates by means of known methods.

It will be noted that in the method according to the invention, the preferred ratio of reagents, in the mixture of benzyl-chloride, sodium carbonate and triethylamine, is 1 mole of benzyl chloride per 0.5 moles of sodium carbonate, the amount of triethylamine is on the other hand, very small, since this chemical product seems to act as a catalyst.

In the method according to the invention, the final dehydration of the mixture preferably takes place by heating at a temperature of the order of 140°C.

Another object of the invention is the use of the said mixture of phthalates as plasticizer in order to obtain PVC, or other flexible vinyl polymers, having distinctly improved anti-stain properties.

EXAMPLE

A method for preparing a particular mixture of phthalates according to the invention, is hereafter described in detail.

In the first stage, a mixture of butyl acid phthalate and phthalic anhydride is prepared, by reacting one mole of phthalic anhydride with 0.65 moles of butyl alcohol, at 105°–120°C for one-half to one hour, depending on the exothermic reaction.

The mixture thus prepared is gradually poured at 100°C, into a mixture of benzyl chloride, anhydrous sodium carbonate and, triethylamine mixed in the molar proportions: 1:4/0.7/0.03. During the reaction, a thickening of the mass is observed. Then 1 mole of water is added and it is left to react for 1 hour at 100°–115°C. The mixture gradually becomes more fluid. It is dehydrated, then heating is continued again for four hours at 140°C.

After esterification, the usual treatments are carried out: decantation, washings, distillation with steam under vacuum, treatment with bleaching clay and animal black.

The yield obtained is 97.4 percent

The mixture of phthalates obtained has the following characteristics:

| | |
|---|---|
| Appearance | Clear liquid |
| Hazen Colouration when cold | 30 |
| Hazen Colouration after 2 hours at 180°C | 90 |
| Density at +20°C | 1.122 |
| Acidity (mg. KOH/g) | 0.08 |
| Volatile matter (30 mins at 180°C) | 1.03% |
| Viscosity at 20°C | 93 cPo |

The chromatographic analysis (gas-liquid) gives the following composition:

| | |
|---|---|
| Butyl-benzyl phthalate | 63.40% |
| Dibenzyl phthalate | 35.96% |

This mixture of plasticizers shows a very good compatability in the compounds based on PVC. The efficiency of the product is of 56.25 percent (test carried out on a mixture without fillers, for a 100 parts by weight of PVC resin, 56.25 parts by weight of plasticizer, minimal proportion necessary for obtaining a given flexibility)

A standard formula of the mixture of this plasticizer and of the compound based on PVC is given below:

| | |
|---|---|
| PVC | 100 parts by weight |
| Plasticizer | 40 parts by weight |
| Stabilizer (Ba and Cd salts) | 1.2 parts by weight |
| Calcium carbonate | 70 parts by weight |
| Titanium oxide | 2 parts by weight. |

The extractability of the plasticizer, by certain chemical agents, is shown by the following table (expressed by the percentage weight loss of the samples):

| Amount of plasticizer (in parts by weight for 100 parts by weight of PVC resin | 30 | 40 | 50 | 65 |
|---|---|---|---|---|
| Essence F | +0.17 | +0.01 | −0.32 | −1.21 |
| Distilled water | 0 | 0 | −0.01 | −0.06 |
| Soap water (1%) | −0.39 | −0.87 | −0.92 | −1.42 |
| Mineral oil | −0.59 | −1.34 | −2.66 | −5.16 |

The resistance, to products which spot, obtained with this plasticizer has been determined on the samples plasticized by the following composition.

| | |
|---|---|
| PVC | 100 parts by weight |
| Plasticizer | 40 parts by weight |
| Hydrophobic calcium carbonate filler "BSH" (Manufactuer OMYA France) | 70 parts by weight |
| Stabilizer "Alzixol 12" Ba and Cd salts | 1.2 parts by weight |
| Titanium oxide | 2 parts by weight |

The following tables give the results for the mixture of phthalates prepared according to the invention (PBB/dB) in comparison with butyl-benzyl phthalate (PBB) and an anti-spot plasticizer having been tested in practise (PA)

| Test (Marechal) at 25°C | Temp (mins) | PBB/dB | PBB | PA |
|---|---|---|---|---|
| Solution having 0.5gm of colourant "oil red powder" Manufacturer: Dupont de Nemours, U.S.A. in 124cc of kerosene R | 1 | 2–3 | 2–3 | 2–3 |
| | 5 | 3–4 | 4 | 3–4 |
| | 15 | 4–5 | 4–5 | 4–5 |
| | 30 | 4–5 | 4–5 | 4–5 |
| (Sommer) Test (6h at 50°C) | | | | |
| Lip sticks | | 4 | 4–5 | 4 |
| Mustard | | 2 | 2–3 | 2 |
| Tomato concentrate | | 4 | 4 | 4 |
| Blue ink (manufacturer BIC France) | | 5 | 5 | 5 |
| Blue ink (manufacturer WATERMAN France) | | 4–5 | 4–5 | 4–5 |
| Bitumen Emulsion "Friabit 470" | | 3 | 4 | 2–3 |

The numeric coding used has the following meaning:
1. - no staining
2. - very slight staining
3. - slight staining
4. - moderate staining
5. - bad staining It can be established that the mixture of phthalates according to the invention is equivalent to a good known anti-staining plasticizer (PA) and is better than butyl benzyl phthalate (PBB)

The mixtures of plasticizer according to the above example and of PVC have the following physical and mechanical characteristics

| Amount of Plasticizer (in parts by weight per 100 parts by weight of resin) | 30 | 40 | 50 | 65 | 80 |
|---|---|---|---|---|---|
| (kgf/cm$^2$) breaking stress | 309 | 243 | 207 | 190 | 155 |
| Modules with 100% elongation (kgf/cm$^2$) | — | 179 | 153 | 104 | 63 |
| Elongation (%) at breaking | 30 | 235 | 270 | 325 | 370 |
| Density | 1.350 | 1.346 | 1.325 | 1.305 | 1.295 |
| Shore hardness A | 96 | 94 | 87 | 77 | 69 |

What we claim is:

1. Method for the direct preparation, in one single esterification operation of an anti-stain plasticizer comprising a mixture of butyl-benzyl phthalate and dibenzyl phthalate having 20 percent to 60 percent by weight of dibenzyl phthalate, which method comprises preparing a mixture of butyl acid phthalate and phthalic anhydride by reacting, at 105°–120°C, phthalic anhydride with a proportion of butyl alcohol corresponding to the proportion of butyl radicals which it is desired to obtain in the final mixture, in the form of butyl ester of phthalic anhydride, gradually pouring the mixture at about 100°C, into a mixture of benzyl chloride, anhydrous sodium carbonate, triethylamine, the amount of benzyl chloride being sufficient to esterify the free anhydrous functions of the phthalic anhydride, adding water in the same molar amount as the phthalic anhydride used, when a thickening is observed, leaving the mixture to react at 100°–115°C, dehydrating by heating, and carrying out the conventional final treatments of isolation and purification.

2. Method according to claim 1, wherein the molar ratio between the benzyl chloride and anhydrous sodium carbonate in the mixture is essentially 2 to 1 and that the amount of triethylamine contained in this mixture is much smaller, of the order of magnitude of the amounts of catalysts used in reactions of this type.

3. Method according to claim 1 wherein the dehydration is carried out by heating at about 140°C.

4. Method according to claim 2 wherein the dehydration is carried out by heating at about 140°C.

* * * * *